US 8,924,541 B2

(12) United States Patent
Hadas et al.

(10) Patent No.: US 8,924,541 B2
(45) Date of Patent: Dec. 30, 2014

(54) MIGRATION OF VIRTUAL RESOURCES OVER REMOTELY CONNECTED NETWORKS

(75) Inventors: David Hadas, Zichron Yaakov (IL); Irit Loy, Bet Hanania (IL); Kenneth Nagin, Mitzpe Hoshiya (IL); Benny Rochwerger, Zichron Yaakov (IL); Alexander Glikson, Haifa (IL); Liran Schour, Kibutz Harduf Doar Na Hamovil (IL)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 13/118,424

(22) Filed: May 29, 2011

(65) Prior Publication Data
US 2012/0303799 A1  Nov. 29, 2012

(51) Int. Cl.
*G06F 15/173* (2006.01)
*G06F 15/16* (2006.01)

(52) U.S. Cl.
USPC ........................... 709/224; 709/226; 709/229

(58) Field of Classification Search
USPC .................. 709/223–226, 217–219, 212, 213
See application file for complete search history.

(56) References Cited

U.S. PATENT DOCUMENTS

| | | | | |
|---|---|---|---|---|
| 8,145,760 B2 * | 3/2012 | Dinda et al. | ................. | 709/226 |
| 8,234,377 B2 * | 7/2012 | Cohn | ............................ | 709/225 |
| 8,583,867 B1 * | 11/2013 | Radhakrishnan et al. | .... | 711/114 |
| 2003/0154306 A1 * | 8/2003 | Perry | ............................ | 709/245 |
| 2009/0276771 A1 | 11/2009 | Nickolov et al. | | |
| 2009/0300719 A1 | 12/2009 | Ferris | | |
| 2010/0125903 A1 * | 5/2010 | Devarajan et al. | .............. | 726/15 |
| 2010/0131624 A1 | 5/2010 | Ferris | | |
| 2010/0306408 A1 | 12/2010 | Greenberg et al. | | |

FOREIGN PATENT DOCUMENTS

WO  2010102084  9/2010

OTHER PUBLICATIONS

Celesti et al., "Improving Virtual Machine Migration in Federated Cloud Environments", 2010 Second International Conference on Evolving Internet, IEEE, pp. 61-67.
Riteau et al., "Shrinker: Efficient Wide-Area Live Virtual Machine Migration using Distributed Content-Based Addressing", Institut National De Recherche En Informatique Et En Automatique, No. 7198, Feb. 2010.
Buyya et al., "InterCloud: Utility-Oriented Federation of Cloud Computing Environments for Scaling of Application Services", C.-H. Hsu et al. (Eds.): ICA3PP 2010, Part I, LNCS 6081, 2010, pp. 13-31.
Liu et al., "Heterogeneous Live Migration of Virtual Machines", Parallel Processing Institute Fudan University, 2008.

(Continued)

*Primary Examiner* — John B. Walsh
(74) *Attorney, Agent, or Firm* — Steven M. Kellner; Eyal Gilboa (57) ABSTRACT

Systems and methods for migrating a virtual resource from a source host in a source network to a destination host in a destination network are provided. In one embodiment, the method comprises establishing a secure communication connection between a source proxy in the source network and a destination proxy in the destination network; and monitoring migration traffic directed from the source host to the source proxy and forwarding said traffic to the destination proxy which in turn forwards the traffic to the destination host over the secure communication connection between the source proxy and the destination proxy, such that the communication addresses of the source host and the destination host remain guarded from direct access by an entity outside of the source network or the destination network.

20 Claims, 8 Drawing Sheets

(56) References Cited

OTHER PUBLICATIONS

Elmroth et al., "Interfaces for Placement, Migration, and Monitoring of Virtual Machines in Federated Clouds", 2009 Eighth International Conference on Grid and Cooperative Computing, IEEE, pp. 253-260.
Hirofuchi et al., "A Live Storage Migration Mechanism over WAN for Relocatable Virtual Machine Services on Clouds", 9th IEEE/ACM International Symposium on Cluster Computing and the Grid, 2009 IEEE, pp. 460-465.
Krautheim, "Building Trust Into Utility Cloud Computing", Doctor of Philosophy, Dissertation and Abstract Approved on Apr. 30, 2010.
Rittinghouse et al., Abstract for "Cloud Computing: Implementation, Management, and Security", CRC Press, Inc., Boca Raton, FL, 2009, ISBN: 1439806802 9781439806807.

* cited by examiner

FIG. 5C ary reproduction by the patent document or the patent disclosure, as it appears in the Patent and Trademark Office patent file or records, but otherwise reserves all copyrights whatsoever.
MIGRATION OF VIRTUAL RESOURCES OVER REMOTELY CONNECTED NETWORKS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to migration of virtualized resources and, more particularly, to a computing environment that supports long-distance migration of virtual resources between remotely connected networks.

BACKGROUND

Virtualized computing refers to a model for enabling convenient and on-demand access to a shared pool of physical resources. The resources are generally connected to or hosted at different computing systems that are either locally or remotely connected in a networked environment. The resources that are virtualized may include storage devices, controllers, processing machines, memory blocks, software tools and other services that may be provisioned over said systems or networks.

Since physical resources available at each hosting environment are finite, at times (e.g., during peak demand), requests for a physical resource may surpass the capacity of that resource. Thus, a virtual resource (also sometimes referred to as a virtual machine (VM)) that is associated with such physical resource may need to be migrated from the source host to a destination host with additional capacity. If both hosts are local or within the same network infrastructure, the migration process typically need not take into account migration issues related to autonomy, privacy and security of the network in which the host environments reside.

In contrast, if a virtualized resource is being migrated over a long-distance (e.g., the migration is to a destination host that is remote to the source host network), additional precaution is needed to preserve the autonomy, privacy and security of both networks before, during and after the migration is completed.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems and methods for migrating a virtual resource from a source host in a source network to a destination host in a destination network are provided. In one embodiment, the method comprises establishing a secure communication connection between a source proxy in the source network and a destination proxy in the destination network; and monitoring migration traffic directed from the source host to the source proxy and forwarding said traffic to the destination proxy which in turn forwards the traffic to the destination host over the secure communication connection between the source proxy and the destination proxy, such that the communication addresses of the source host and the destination host remain guarded from direct access by an entity outside of the source network or the destination network.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
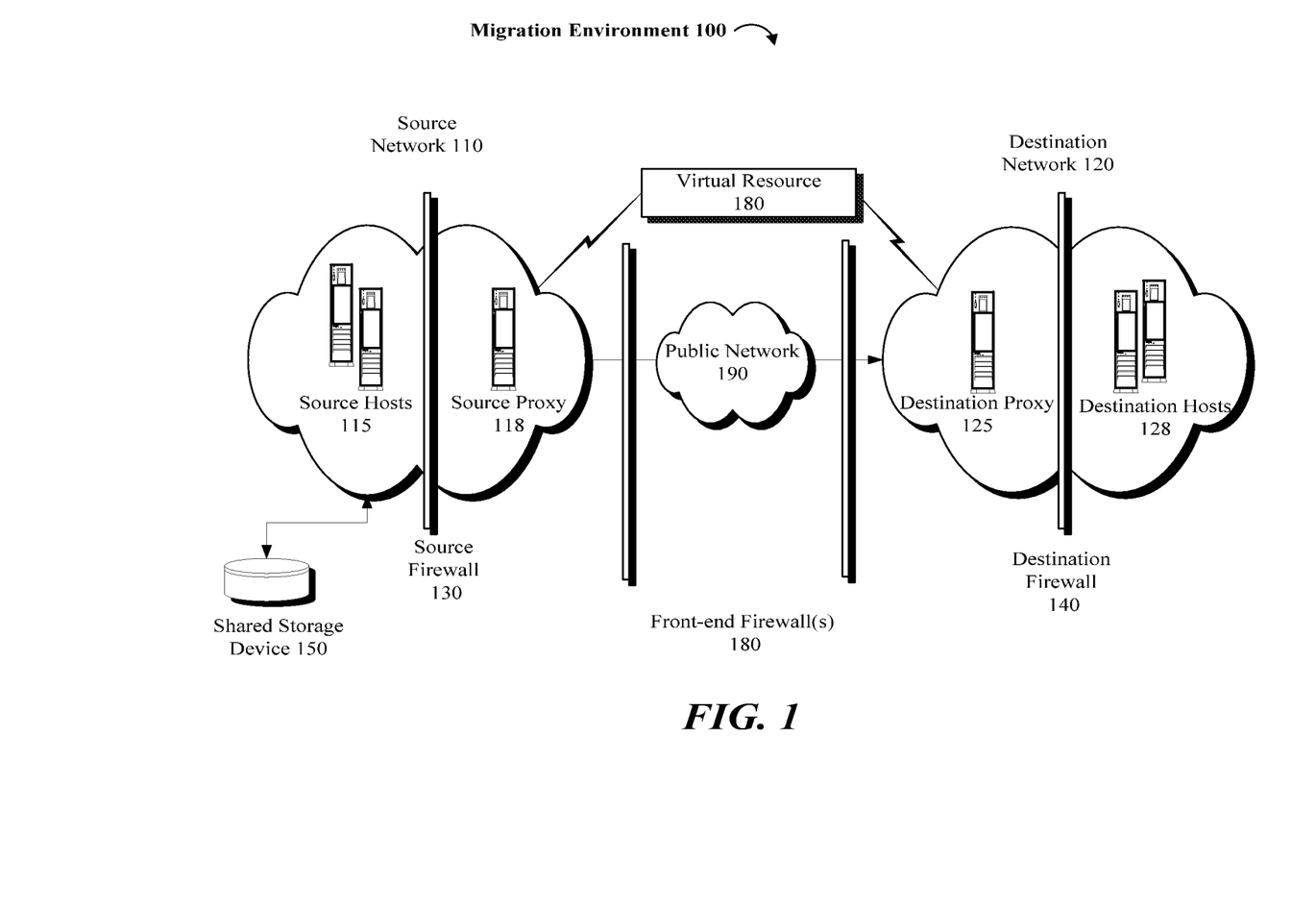
FIG. 1 illustrates an exemplary migration environment in accordance with one or more embodiments, wherein a virtual resource is migrated from a source network to a destination network.

Referring to FIG. 1, an exemplary migration environment 100 is illustrated in which a virtual resource 180 hosted at source network 110 is being migrated to a destination network 120. Source network 110 may include one or more source hosts 115 over which virtual resource 180 is hosted. The virtual resource 180 may be provisioned to provide one or more services or resources to a requesting client system that is in communication with source network 110.

For simplicity, we consider an exemplary scenario in which the virtualized resource 180 provides access to a shared storage device 150 in source network 110. It is noteworthy that the scenario provided here is by way of example and should not be construed as limiting the scope of the claimed subject matter to the particular details disclosed below. Depending on implementation, virtual resource 180 may be provisioned to allocate the available storage media on shared storage device 150 among several storage clients (not shown) according to demand and other factors.

When shared storage device 150 is allocated to capacity or near capacity, if additional demand for storage is anticipated, then either virtual resource 180 or the source hosts 115 will deny additional requests for access to shared storage device 150. Alternatively, the administration of source network 110 may attempt to migrate virtual resource 180 to a destination network 120, if it is determined that destination network 120 has additional unutilized storage resources (not shown) that can service the anticipated requests.

To migrate virtual resource 180 from source network 110 to destination network 120, virtual resource 180 and the related information and operating data, including the respective memory and state information of virtual resource 180 are transferred over to one or more destination hosts 128 that reside in destination network 120. In the exemplary embodiment shown in FIG. 1, the destination network 120 is considered to be remote to source network 110 and, as such, the source hosts 115 and destination hosts 128 may be separated by a series of firewalls and guarded by one or more proxy servers to ensure the autonomy, privacy and security of each network.

In one embodiment, a source firewall 130 may be implemented between source hosts 115 and one or more source proxies 118; and a destination firewall 140 may be implemented between destination hosts 128 and one or more destination proxies 125. Further, one or more additional firewalls (e.g., front-end firewalls 180) may be implemented between source network 110 and destination network 120. Categorically, in certain embodiments, the source firewall 130 and destination firewall 140 are internal to source network 110 and destination network 120, respectively.

In contrast, the front-end firewalls 180 may be external to source and destination networks 110 and 120 and may be configured to monitor traffic directed from an external source over a public network 190. That is, in some embodiments, two private networks (e.g., source network 110 and destination network 140) may be connected via a public network 190 (e.g., the Internet). In such an implementation, it is desirable to maintain the privacy and anonymity of the host machines (e.g., source hosts 115 and destination hosts 128) that are internal to the private networks 110 and 120.

Figure 2:
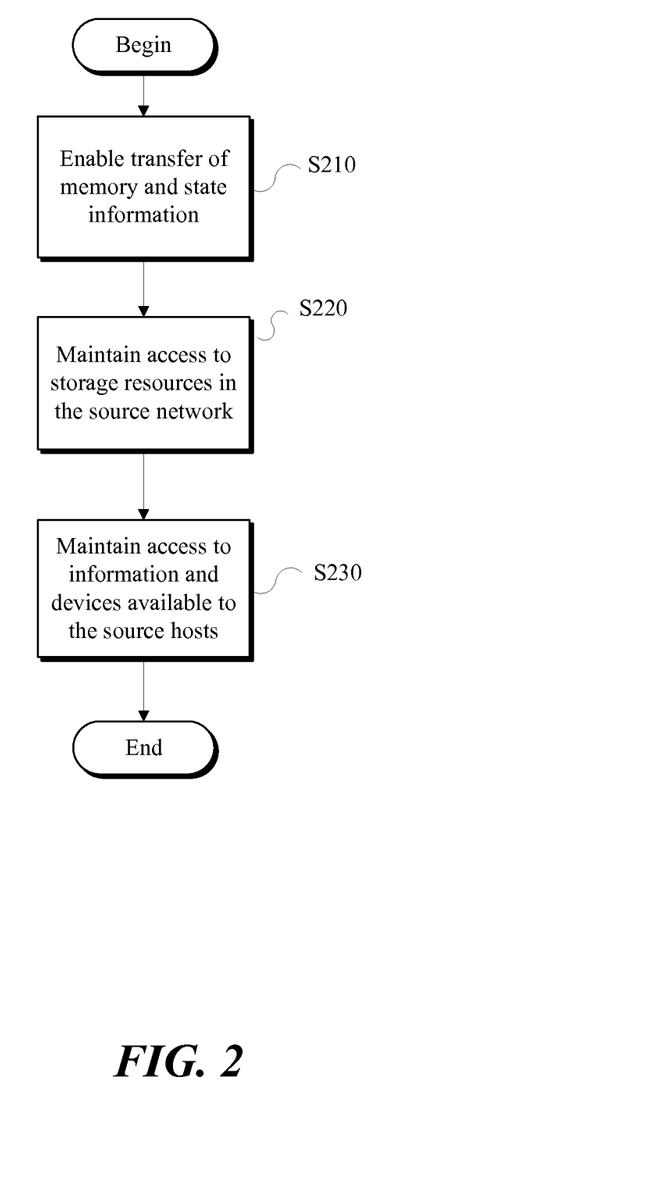
FIG. 2 is a flow diagram of an exemplary method for migrating a virtual resource in the network environment shown in FIG. 1, in accordance with one embodiment.

In other words, conceptually, during a live long-distance migration of virtual resources across independent networks, the insularity of the respective networks is to be maintained so that the infrastructural autonomy, privacy and security attributes of each network is respected. Accordingly, referring to FIG. 2, the following events and actions may be taken into consideration when implementing the constructs of a migration procedure:

(1) enabling the transfer of memory and state information for the migrating virtual resource, while maintaining anonymity of the source and destination hosts on which the virtual source is hosted (210);

(2) maintaining the virtual resource's access to shared storage in the source network, once migration of the virtual resource to the destination network is completed, without comingling the storage resources of the source and destination networks (220); and (3) maintaining the virtual resource's access to information and devices available to the hosts residing in the source network, after the long-distance migration of the virtual resource to the destination hosts is completed (230).

In the context of long-distance migration of virtual resources between independent networks, it is noteworthy to mention that source network 110 and destination network 120 may be logically separated in distinct administrative domains. Thus, migration of virtual resource 180 across distinct administrative domains may introduce an additional layer of complexity associated with the degree of insularity that is to be maintained between the two private networks 110 and 120.

Insularity, in one implementation, refers to a private network's underlying infrastructure which ensures autonomy, security and privacy for the network. Autonomy refers to the ability of a network to independently administer its computing infrastructure (e.g., software or hardware utilities) without considering relationships or connections with sources outside of the network. For example, a requirement that destination network 120 is to use the same vendor's hardware as source network 110 because the destination hosts 128 are to host virtual resource 180 would violate destination network's 120 autonomy.

Furthermore, routine information technology (IT) operations, desirably, should not require the consent of another network's administration. Traditional examples of routine IT operations include: control over the power state of network or storage services; the addition or removal of any piece of IT hardware; hardware re-configuration; server, network, or storage topology reorganization; changes in addressing schemes, or administration of storage resources (e.g., network attached storage (NAS), storage area network (SAN), disk attached storage (DAS), etc.).

Routine IT operations may also include the management of server, network, and storage virtualization. For example, a placement for virtual services or machines may be motivated by a network's internal policy to allow the freedom to move around a local virtual storage or network service without the need to pre-qualify such changes or modifications in concert with the administrations of other networks.

In one implementation, security refers to the extent that an intruder is able to compromise a private network's operations and how well the network is protected to secure the hosted applications and data. In one embodiment, access from sources external to the networks is precluded, except for sources located in a designed area (e.g., a demilitarized zone (DMZ)). Moreover, source or destination hosts 115 and 128 may be configured with non-routable addresses or be hidden behind a network address translation (NAT) service to maintain the anonymity of the hosting machines.

It is noteworthy that to migrate virtual resource 180, the communication address for the source and destination hosts 115 and 128 may be needed. As provided in further detail below, to maintain the anonymity of source hosts 115 and destination hosts 128, instead of utilizing the communication address (e.g., the internet protocol (IP) address) of each host for accomplishing the long distance migration, one or more proxy servers (e.g., source proxy 118, destination proxy 125) may be employed.

That is, the proxy servers 118 and 125 may be utilized to help maintain the private communication address of the source and destination hosts 115 and 128 secure. Thus, in one embodiment, the addresses of the proxy servers will be utilized for communicating the requisite information over the public network 190, instead of the private addresses of the source and destination hosts 115 and 128. As such, a potential security breach may be avoided by keeping the source and destination hosts' 115 and 128 addresses confidential (i.e., by not having to make the hosts' private addresses available for access over a public network such as the Internet).

Additional optional or desired security features may be implemented by configuring the private networks 110 and 120 to communicate, for example, exclusively with predetermined and recognizable authorized external sources. Further, the services provided through each private network 110 and 120 may be limited in time and scope. In one embodiment, duration of migration of a resource from one network to the other may be measured and monitored such that once the migration completes, the established connections between the two private networks 110 and 120 is disconnected.

In one implementation, privacy refers to the extent to which a private network reveals the hardware and software used by the administration and the IT infrastructure topology and activity. Privacy measures are set in place, in accordance with one or more embodiments, to enable administrations to remain competitive and execute their business decisions and IT processes. In this manner, the internal setup and any proprietary configuration of private networks and servers may remain confidential. As an example, the levels of service offered to customers, including physical server capacity, network bandwidth, storage over-commitment and the like may remain in confidence.

Since privacy is also a corollary to autonomy, in the disclosed embodiments, concealing a network's IT-related decisions allows the maximum flexibility to make future IT changes. Furthermore, maintaining network infrastructure privacy enhances network security, as less information is publically exposed; and as a result, a potential intruder will not have a chance to exploit such private information. In the following, an exemplary implementation for enabling a long-distance migration is provided, in consideration with the above-noted factors related to autonomy, security and privacy.

Figure 3:
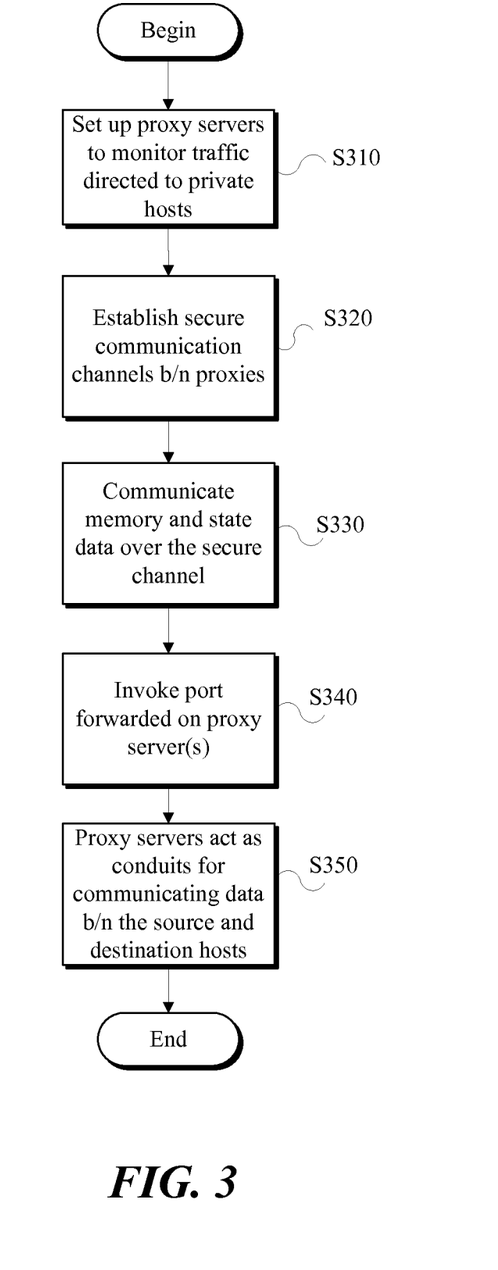
FIG. 3 is a flow diagram of an example implementation that enables the secure migration of a virtual resource in an autonomous and secure network environment, in accordance with one embodiment.

Referring to FIGS. 1 and 3, to maintain the proper insularity between source network 110 and destination network 120, the communication addresses of the source and destination hosts 115 and 140 are kept private, in an example embodiment. As noted earlier, to accomplish this, one or more proxy servers (e.g., source proxy 118 and destination proxy 125) are set up on each end and are designated to provide an indirect and secure route for monitoring traffic directed to private hosts 115 and 128 over the public network 190 (S310).

In one embodiment, the proxy servers 118 and 125 may reside in a separate secure area, known as the DMZ (e.g., the zone between a front-end firewall and a back-end firewall in a private network). Front-end firewalls 180 may be configured to allow, for example, source proxy 118 to access destination proxy 125 over a public network 190 by way of leaving open a predefined set of communication ports on the destination proxy 125. Destination firewall 140 may be configured to block access from source network 110 to the locally administered destination host 128, but allow the local destination proxy 125 limited access to destination host 128 by way of exposing a set of predefined ports at destination proxy 128.

The above implementation would block access from external entities, such as hosts belonging to other administrations, to the internal hosts and resources of destination network 120. A similar setup may be applied to source network 110. In this manner, source and destination hosts 110 and 120 may be kept private and secure and will be able to provide inter-network services, such as supporting long-distance live migration of virtual resources.

In accordance with one embodiment, one or more secure communication channels are established between source proxy 118 and destination proxy 125 (S320). Such communication channels may optionally be connected and disconnected ad-hoc or on demand, in contrast to a connection that is maintained over a predefined amount of time or indefinitely. The established communication channels are secured so that a site proxy may both identify its peers and ensure that traffic arriving from the peers is authentic and complete. Depending on implementation, traffic compression may be used where needed.

In one example implementation, several proxy-to-proxy secure communication channels are identified, based on the use case and the scope of use, for example. The memory and state of the virtual resource 180 is transferred between the source and destination proxies 118 and 125, over said one or more secure communication channels during the migration (S330). As part of the migration initialization, a destination host 128 in destination network 120 may be selected, according to internal and private administration considerations.

Upon the selection of destination host 128 and desirably before migration starts, a port forwarder on destination proxy 128 is invoked (S340). The port forwarder (not shown) is utilized to provide a connection between destination proxy 125 and destination host 128 acting as a switch to allow destination proxy 125 forward data received from source proxy 118 to destination server 128. A similar relationship may be established between source proxy 118 and source hosts 115 to enable the proxy servers 118 and 125 act as conduits between source host 115 and destination host 128 with respect to data communicated over the secure communication channels (S350).

Desirably after the establishment of the secure communication channels between proxy servers 118 and 125 and the provisioning of the port-forwarding connections or services between the respective hosts and proxies, the migration process is invoked to migrate virtual resource 180. In one example embodiment, the communication address (e.g., the IP address) of destination proxy 125 (i.e., not the address of destination host 128) is used to forward data from source proxy 118 to destination proxy 125. From the perspective of source and destination hosts 115 and 128, passage of migration data through proxies 118 and 125 is transparent.

Once the migration is completed, the port forwarding connections between the corresponding hosts and the proxies may be closed. Depending on implementation, the secure communication channel established between the source and destination proxies 118 and 125 may remain connected during the migration and optionally is disconnected after the migration is completed, or alternatively is left open if future migrations are anticipated. Data communicated over the secure communication channel may be compressed to reduce traffic bandwidth needed to transmit the data across the public network 190.

Aside from the state and memory data for a virtual resource 180, which are transferred from the source host 115 to destination host 128, additional data utilized by virtual resource 180 may be stored in a data storage device in source network 110. Such data, in one embodiment, may be too large to transfer to destination network 120 and, in one embodiment, may remain stored on a local storage medium in source network 110. To provide access to such data after virtual resource 180 is migrated to destination host 128, one or more secure inter-network storage channels may be established between the source network 110 and destination network 120.

The inter-network storage channels may be supported by a storage proxy connected locally to source network 110 and a counterpart storage proxy connected locally to destination network 120. For the purpose of simplicity, separate proxy servers associated with the above storage proxies are not depicted in FIG. 1. One of ordinary skill in the art would however appreciate that said storage proxies may be implemented in a similar manner as disclosed here with respect to source proxy 118 and destination proxy 125, with the difference that in certain embodiments, the storage proxy on the source network may have a direct connection to the storage devices or mediums on which the data targeted by virtual resource 180 is stored.

In other words, the proxy servers in this implementation may be configured to act as conduits between the storage devices in source network 110 and the destination host, in destination network 120. In one embodiment, the above-disclosed mechanism for transfer and replication of state information for virtual resource 180 may be used during live migration to enable the transfer of disk content from source network 110 to destination network 120 over the established secure communication channels between networks 110 and 120. This implementation would improve network insularity and maximize performance after the migration is completed by locally storing information on which virtual resource 180 operates with respect to destination network 120 to which virtual resource 180 has migrated.

In accordance with one embodiment, a virtual networking solution is implemented to maintain the communication connection between virtual resource 180 and other resources locally connected to source network 110, after virtual resource's 180 migration to destination network 110. This implementation supports the insularity of the two networks 110 and 120 by way of directing the communication between the resources on the different networks through network communication proxies configured for this purpose.

Depending on implementation, source proxy 118 and destination proxy 125 may be configured to support the communication connection between virtual resource 180 and other resources (e.g., VMs) locally connected to source network 110. Alternatively, other proxies or dedicated proxies (not shown) may be included in the infrastructure of each network 110 and 120 to act as conduits between the migrated virtual resource 180 and the source network 110 local resources.

To implement the virtual network that covers and connects the migrated virtual resource 180 to resources in source network 110, a virtual application network (VAN) may be utilized. Using VAN, different virtual resources connected to the same or different isolated virtual networks may be hosted on the same host or on a collection of physical hosts that is distributed across multiple networks and possibly owned by different administrations or domains. One of the benefits offered by VANs is that if all resources are migrated to destination network 120, the service no longer depends on the source network 110.

Another benefit is that co-located resources (e.g., VMs located on the same local network) communicate directly with each other and do not suffer the delay associated with routing their communication through the respective proxies. In other words, virtual resources on the destination site may interact directly and do not need the support of network services from the source site. In one example, the above implementation improves upon a mobile IP protocol which may need routing through the source network (e.g., home network), for a node that has moved outside the source network.

In one embodiment, the VAN may be used to extend the services of source hosts 115 (e.g., the host hypervisor) beyond the traditionally defined isolated and virtualized computing environment of source hosts 115 to cover virtual resource 180 after it has migrated to destination host 128 using a communication bridge (e.g., an edge bridge) implemented using a host virtual Ethernet bridge (VEB), for example. An overlay network may be established between hypervisors, so that the VAN is extended to include multiple dislocated edge bridges. Using the VAN technology, virtual resource 180 may migrate across subnets of both networks 110 and 120.

Depending on implementation, VAN services auto-adapt to serve virtual resources across subnet and site boundaries and fit an ad-hoc resource placement. The VANs ensures isolation between networks 110 and 120 by directing VAN traffic via the corresponding proxies discussed earlier, using a secure inter-network channel. The proxies ensure that VAN traffic between networks 110 and 120 is transferred without revealing the internal or confidential port and communication addresses of the respective network or hosts by configuring each proxy to present itself to the local network as if it hosts a group (e.g., all) the virtual resources in the remote network.

In practice, the proxy is not need to host any virtual service, but instead the proxy may swap the identifiers prior to forwarding the virtual packets to the counterpart proxy in the remote network. The remote proxy uses a similar strategy and presents itself as the proxy hosting the resources of the remote site, thus hiding the internal information of the remote site from the local site. The remote proxy uses a similar identifier swapping technique prior to forwarding the packets to the hosts at the remote site. In this way, VAN technology may be used to enable and enhance network insularity.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
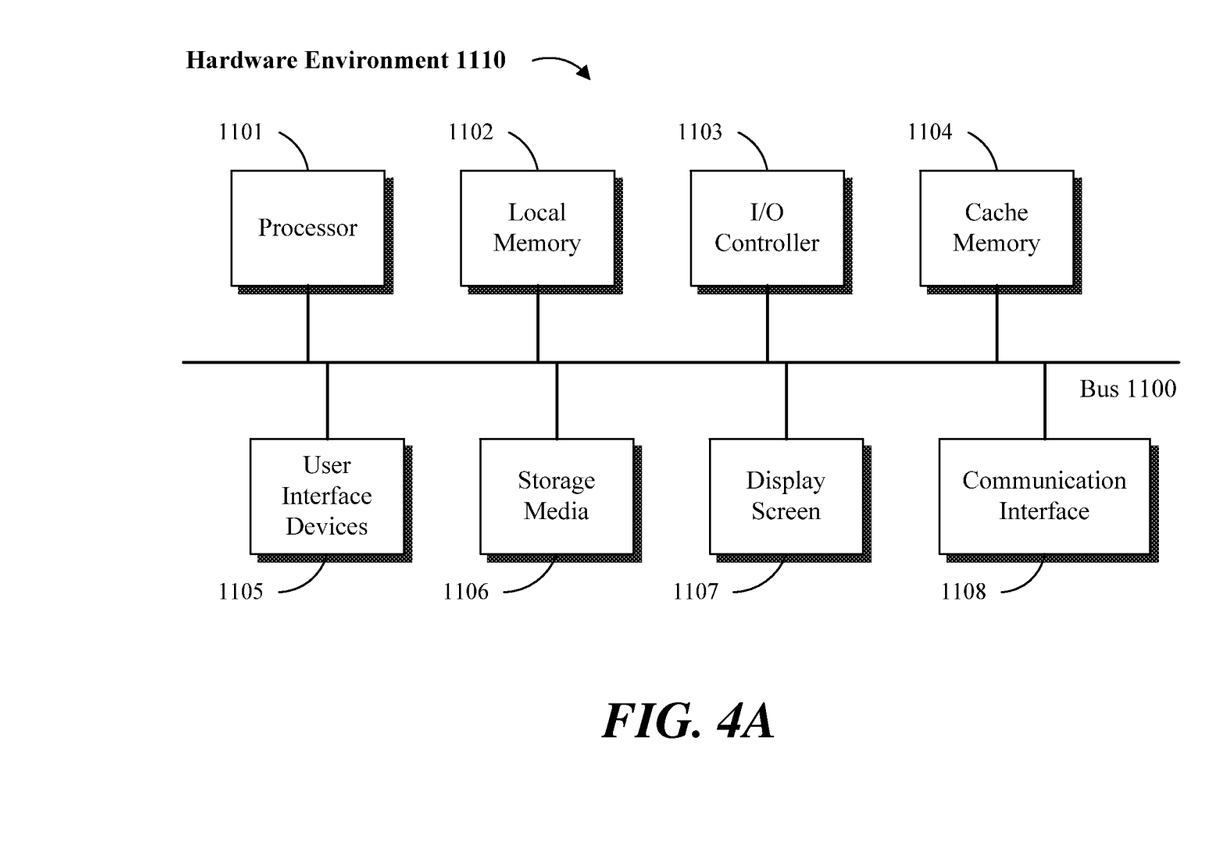
FIGS. 4A and 4B are block diagrams of hardware and software environments in which the disclosed systems and methods may operate, in accordance with one or more embodiments.
Figure 4B:
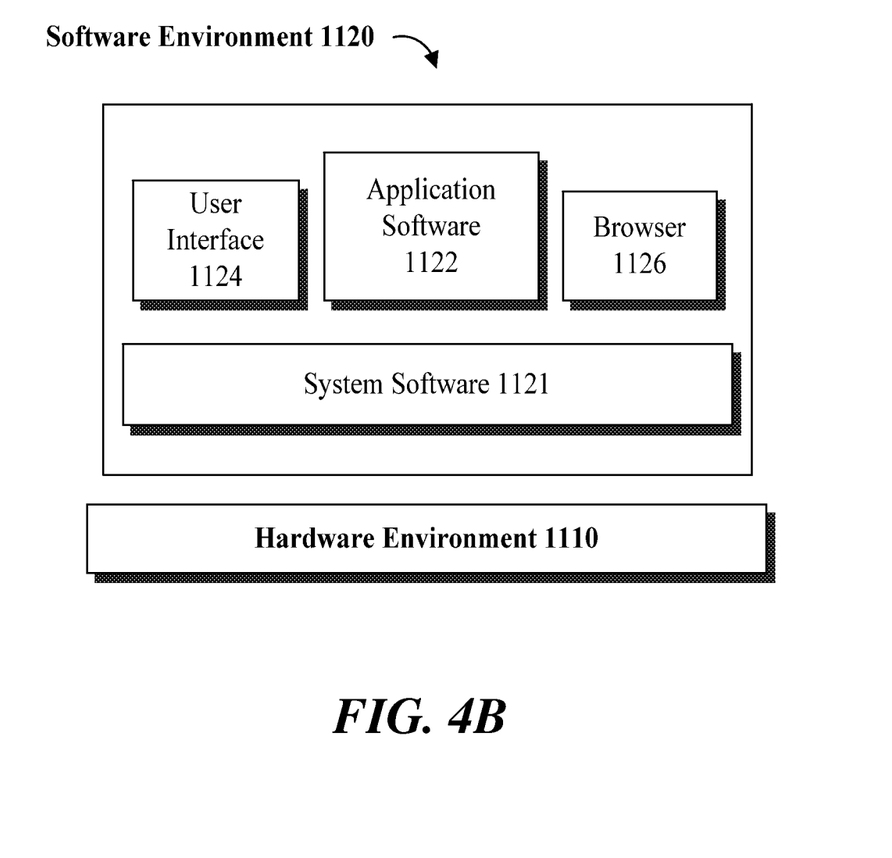

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

Figure 5A:
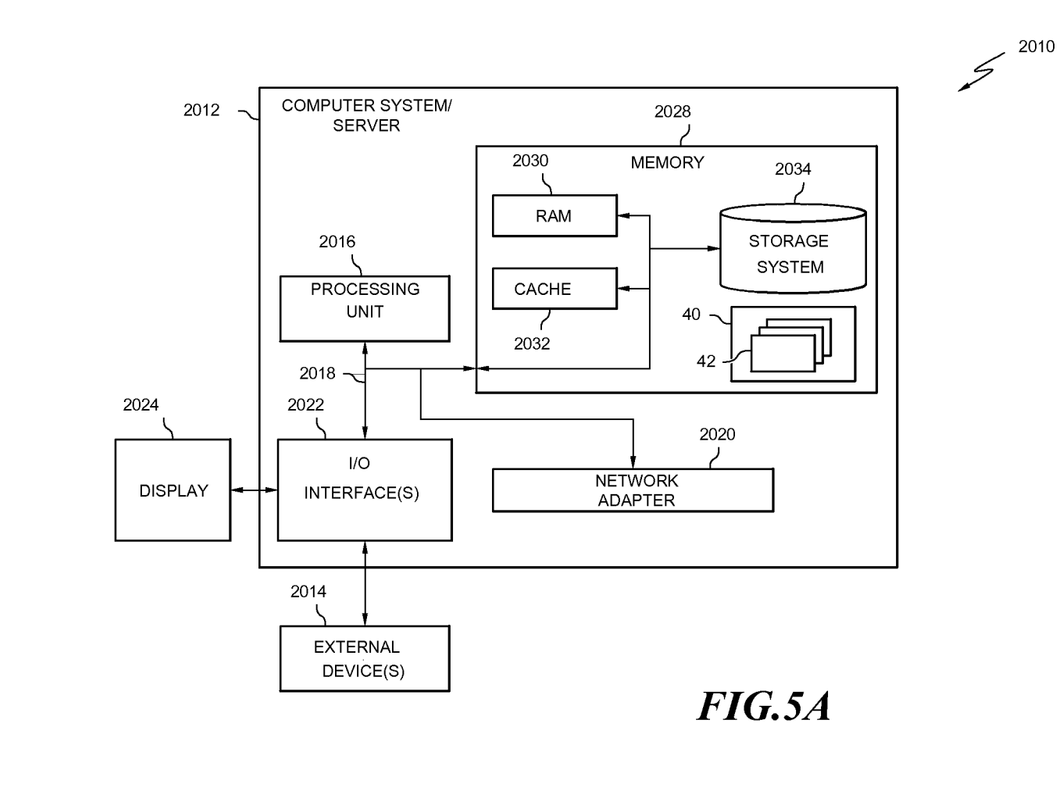
FIGS. 5A, 5B and 5C depict one or more nodes and abstraction model layers in an exemplary network environment that supports a distributed wide area network infrastructure, in accordance with one or more embodiments.

A cloud computing environment is service oriented with a focus on statelessness, low coupling, modularity, and semantic interoperability. At the heart of cloud computing is an infrastructure comprising a network of interconnected nodes. Referring now to FIG. 5A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided.

In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network 190 (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 5B:
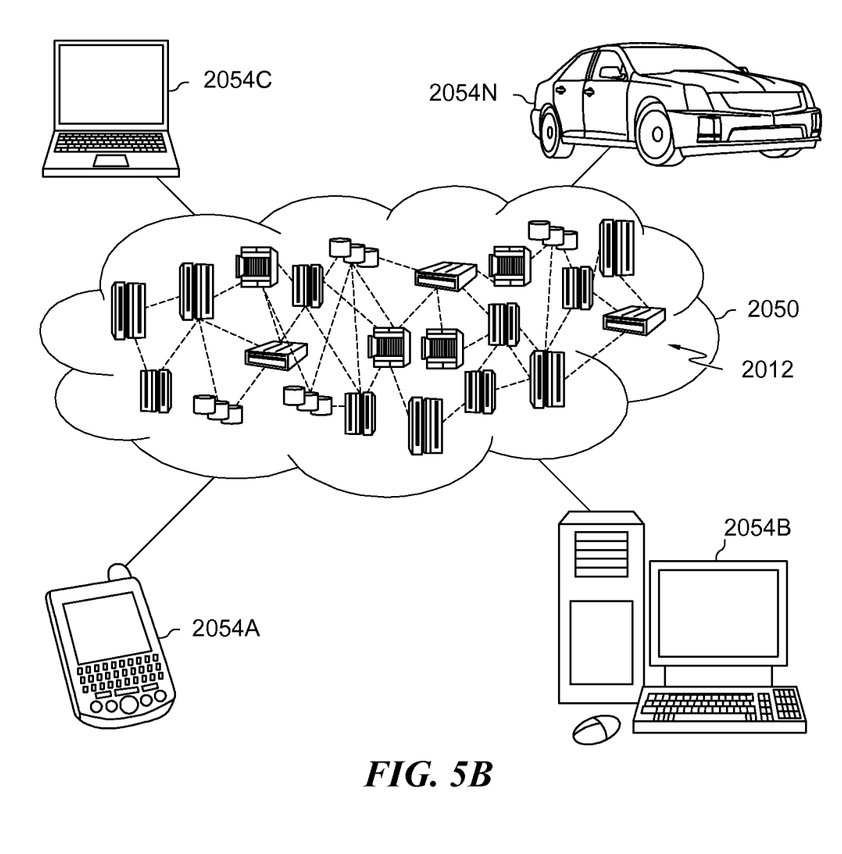

Referring now to FIG. 5B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 54A-N shown in FIG. 5B are intended to be illustrative only and that computing nodes 2010 and cloud computing environment 2050 may communicate with any type of computerized device over any type of network and/or network addressable connection (e.g., using a web browser).

Figure 5C:
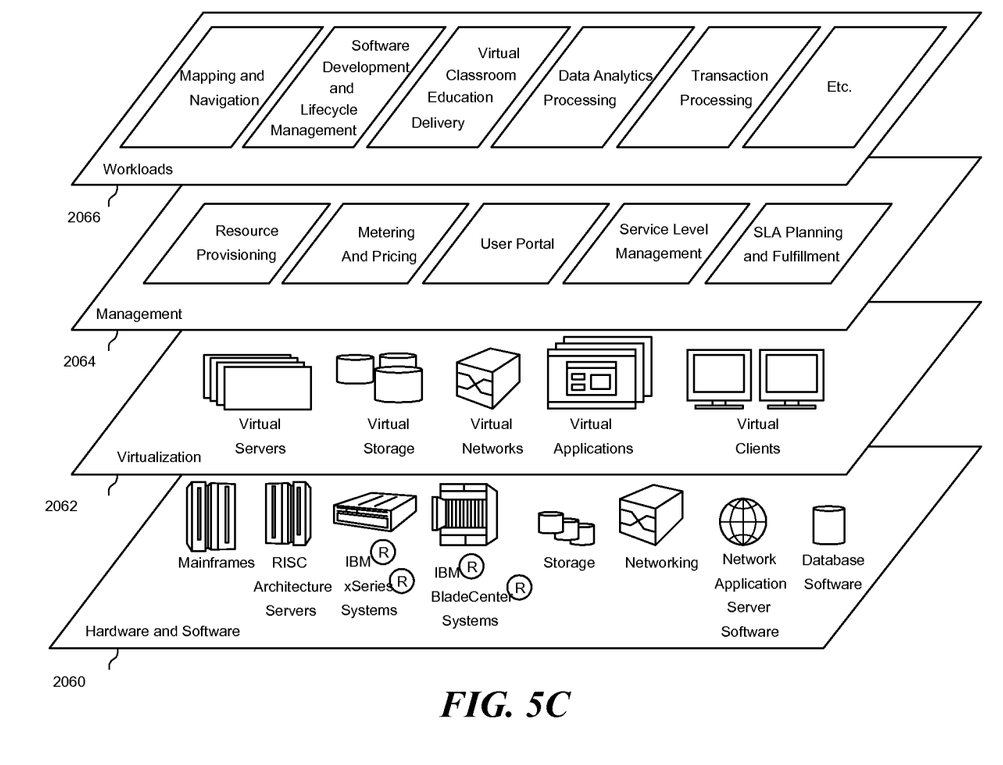

Referring now to FIG. 5C, a set of functional abstraction layers provided by cloud computing environment 2050 (FIG. 5B) is shown. It should be understood in advance that the components, layers, and functions shown in FIG. 5C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

What is claimed is:
1. A method implemented for execution on one or more processors, the method comprising:
   migrating a virtual resource from a source host in a source network to a destination host in a destination network;
   establishing a secure communication connection between a source proxy in the source network and a destination proxy in the destination network;
   monitoring migration traffic directed from the source host to the source proxy and forwarding said traffic to the destination proxy which in turn forwards the traffic to the destination host over the secure communication connection between the source proxy and the destination proxy, such that the communication addresses of the source host and the destination host remain guarded from direct access by an entity outside of the source network or the destination network; and
   maintaining the virtual resource's access to one or more resources locally connected to the source network after the virtual resource is migrated from the source host to the destination host, while also supporting at least a virtual machine that is running on the destination network with access to virtual resources on the destination network, without the virtual machine interacting with the source network.

2. The method of claim 1, wherein the destination host is remote with respect to the source host.

3. The method of claim 1, wherein the virtual resource was locally connected to the source network, prior to the migration.

4. The method of claim 1, further comprising forwarding data sent to an input port on the source proxy to a port on destination proxy and forwarding the data to the destination host to accommodate the flow of communication that is directed to the source proxy from the source host in order to support migration of virtual resources from the source network to the destination network.

5. The method of claim 1, further comprising communicating state information for the virtual resource from the source host to the destination host via the secure communication connection.

6. The method of claim 1, wherein a destination firewall is constructed between the destination proxy and the destination host to protect the autonomy and security of the destination host, a source firewall is constructed between the source proxy and the source host to protect the autonomy and security of the source host, and wherein the source and destination hosts indirectly communicate by way of the source proxy and destination proxy acting as conduits.

7. The method of claim 1, wherein the virtual resource's access to the resources locally connected to the source network is maintained by way of establishing a secure communication connection between the virtual resource and a host machine in the source network that hosts said local resources.

8. The method of claim 7, wherein one or more additional proxy servers, separate from the source proxy and the destination proxy and included in the infrastructure of the source network and in the infrastructure of the destination network are utilized to act as conduits between the virtual resource running on the destination network and the resources locally connected to the source network, during or after the virtual resource is migrated to the destination host.

9. The method of claim 7, further comprising implementing a virtual application network to maintain connection between the virtual resource and at least another virtual resource locally supported by the source network, during or after the virtual resource is migrated to the destination host, while supporting localized communication between co-located virtual machines on the destination network without interaction with the source network.

10. A system comprising one or more processors for migrating a virtual resource from a source host in a source network to a destination host in a destination network, the system comprising:
  a logic unit for establishing a secure communication connection between a source proxy in the source network and a destination proxy in the destination network;
  a logic unit for monitoring migration traffic directed from the source host to the source proxy and forwarding said traffic to the destination proxy which in turn forwards the traffic to the destination host over the secure communication connection between the source proxy and the destination proxy, such that the communication addresses of the source host and the destination host remain guarded from each other and direct access by an entity outside of the source network or the destination network; and
  a logic unit for maintaining the virtual resource's access to one or more resources locally connected to the source network after the virtual resource is migrated from the source host to the destination host, while also supporting at least a virtual machine that is running on the destination network with access to virtual resources on the destination network without the virtual machine interacting with the source network.

11. The system of claim 10, wherein the destination host is remote with respect to the source host.

12. The system of claim 10, wherein the virtual resource was locally connected to the source network, prior to the migration.

13. The system of claim 10, further comprising a logic unit for forwarding data sent to an input port on the source proxy to a port on destination proxy and forwarding the data to the destination host to accommodate the flow of communication that is directed to the source proxy from the source host in order to support migration of virtual resources from the source network to the destination network.

14. The system of claim 10, further comprising a logic unit for communicating state information for the virtual resource from the source host to the destination host via the secure communication connection.

15. The system of claim 10, wherein the virtual resource's access to the resources locally connected to the source network is maintained by way of establishing a secure communication connection between the virtual resource and a host machine in the source network that hosts said local resources.

16. A computer program product comprising a non-transient computer readable storage medium having a computer readable program, wherein the computer readable program when executed on a computer causes the computer to:
  migrate a virtual resource from a source host in a source network to a destination host in a destination network;
  establish a secure communication connection between a source proxy in the source network and a destination proxy in the destination network;
  monitor migration traffic directed from the source host to the source proxy and forwarding said traffic to the destination proxy which in turn forwards the traffic to the destination host over the secure communication connection between the source proxy and the destination proxy, such that the communication addresses of the source host and the destination host remain guarded direct access by an entity outside of the source network or the destination network; and
  maintain the virtual resource's access to one or more resources locally connected to the source network after the virtual resource is migrated from the source host to the destination host, while also supporting at least a virtual machine that is running on the destination network with access to virtual resources on the destination network without the virtual machine interacting with the source network.

17. The computer program product of claim 16, wherein the destination host is remote with respect to the source host.

18. The computer program product of claim 16, wherein the virtual resource was locally connected to the source network, prior to the migration.

19. The computer program product of claim 16, wherein the computer readable program, when executed on a computer, further causes the computer to communicate state information for the virtual resource from the source host to the destination host via the secure communication connection.

20. The computer program product of claim 16, wherein the virtual resource's access to the resources locally connected to the source network is maintained by way of establishing a secure communication connection between the virtual resource and a host machine in the source network that hosts said local resources.

* * * * *